United States Patent
Weiss

(10) Patent No.: US 8,695,886 B1
(45) Date of Patent: Apr. 15, 2014

(54) MEMORY CHIP DEVICE

(71) Applicant: Donald Weiss, Perrysburg, OH (US)

(72) Inventor: Donald Weiss, Perrysburg, OH (US)

( * ) Notice: Subject to any disclaimer, the term of this patent is extended or adjusted under 35 U.S.C. 154(b) by 0 days.

(21) Appl. No.: 13/765,717

(22) Filed: Feb. 13, 2013

Related U.S. Application Data

(60) Provisional application No. 61/599,997, filed on Feb. 17, 2012.

(51) Int. Cl.
*G06K 19/06* (2006.01)

(52) U.S. Cl.
USPC ....... 235/492; 340/10.1; 340/572.8; 455/41.1

(58) Field of Classification Search
USPC ............... 235/492; 340/10.1, 572.8; 455/41.1
See application file for complete search history.

(56) References Cited

U.S. PATENT DOCUMENTS

| | | | |
|---|---|---|---|
| 6,349,266 B1 | 2/2002 | Lysaght | |
| 7,278,166 B2 | 10/2007 | Inokuchi et al. | |
| 2005/0142907 A1 | 6/2005 | Myer et al. | |
| 2007/0069036 A1* | 3/2007 | Baba | 235/492 |
| 2007/0082542 A1 | 4/2007 | Norris et al. | |
| 2007/0234215 A1* | 10/2007 | Graham et al. | 715/723 |
| 2010/0220435 A1 | 9/2010 | Fahey et al. | |
| 2010/0308964 A1* | 12/2010 | Ackley et al. | 340/10.1 |
| 2011/0275178 A1 | 11/2011 | Trezza et al. | |
| 2012/0098641 A1* | 4/2012 | Whittle | 340/10.1 |
| 2012/0168522 A1* | 7/2012 | Stimek et al. | 235/492 |
| 2013/0045680 A1* | 2/2013 | Dua | 455/41.1 |

* cited by examiner

*Primary Examiner* — Allyson Trail
(74) *Attorney, Agent, or Firm* — Emch, Schaffer, Schaub & Porcello Co., LPA

(57) ABSTRACT

In operation the storage device of this invention is an attachment to a player/recorder such as an iPhone or iPod. The storage device allows the user to record content, store it on the storage device, retrieve the content, and display/play the content on the host device. The software may come pre-loaded on the storage device. The storage chip may have an adhesive back and comes in different colors, shapes and sizes.

5 Claims, 3 Drawing Sheets

MEMORY CHIP DEVICE

CROSS REFERENCE TO RELATED APPLICATION

The present patent application is based upon and claims the benefit of provisional patent application No. 61/599,997, filed on Feb. 17, 2012.

The memory chip device of this invention is a storage device. In operation, the storage device is attached to the external case of a player/recording device such as an iPhone or iPod. In one embodiment, the device uses RFID technology.

BACKGROUND OF THE INVENTION

Many of the recent personal computers are provided with a CD playing function to store (copy) musical information distributed via a CD into a hard disc in a hard disc drive. This is built in the personal computer to reproduce musical information from the hard disc. Copying to a card-type memory player may be effected at a high speed that copying from the hard disc in the personal computer. More precisely, copying from the hard disc to the card-type memory player provides a second-generation copy while musical information stored in the hard disc cannot be copied to the card-type memory player.

The "standard playback time" is a real-time playback speed for audio signals. This, however, does not lend itself to use with recent developed player/recording devices which often are hand held.

SUMMARY OF THE INVENTION

In operation the storage device of this invention is an attachment to a player/recorder such as an iPhone or iPod. The storage device allows the user to record content, store it on the storage device, retrieve the content, and display/play the content on the host device. The software may come preloaded on the storage device.

The storage chip may have an adhesive back and comes in different colors, shapes and sizes. The chips can be placed on photos, medical records, documents, recipes, books and book bindings, greeting cards, yearbooks, scrap book instructions, business cards, files, maps, RX bottles, memos, and visors.

In the preferred embodiment, the storage device is an RFID device. In another embodiment, the storage device is hardwired to the player recorder.

In still another embodiment, the chip device may use a surface contact interface (SCI). The device includes an insulative housing having a plurality of walls defining an interior cavity and a plurality of contacts within the cavity and extending through one of the walls to an exterior of the housing for surface mounting. The contacts are formed to ensure coplanarity of the contacts for surface mounting to the player/recorder.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

The main components of this invention include a mostly metallic casing, an RFID (radio frequency identification) device embedded within, a plastic cup and/or epoxy filler to secure the RFID device within the metallic casing.

Additional components of this invention include peripheral devices to read, write, and edit data within the RFID device. These "reader" devices may also include analog or digital electrical means to communicate with exterior equipment.

The casing is a singular or multiple metallic materials in the shape of a disc. The metallic materials may be separated in an annular or cross-sectional layers, or the metallic materials may be applied as a shell. Typically, the casing has an opening (for example, but not limited to an axial circular hole) to allow placement of the RFID device.

The radio frequency identification (RFID) device contains electronics powered by radio signals. Furthermore, digital data is transmitted to and from the RFID device by the same radio signals. RFID devices are a known technology.

FIGS. 1 to 4 show the memory chip device and casing. All embodiments are typically, but not limited to, disc-shaped. All embodiments typically are of dimensions similar to existing tokens but not similar to government coins. All embodiments typically are of materials chosen to be dissimilar to existing tokens in regards to other verification techniques such as inductive sensing. All embodiments typically will carry indicia, ridges, and edge markings.

Figure 1:
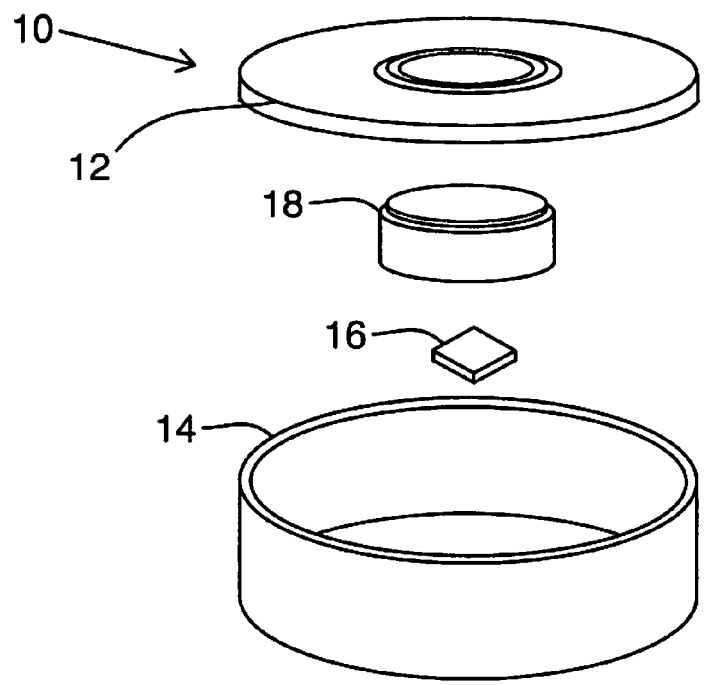
FIG. 1 is an exploded view of conductive face memory chip device according to this invention.

FIG. 1 shows a device having two-piece drawn casing 10. Casing 10 comprises top piece 12 and bottom piece 14. Casing 10 is fabricated of a metal, such as but not limited to brass, which is suitable to cold drawing processes. The two pieces are formed separately, but to dimensions that allow top piece 12 to slip inside bottom piece 14. After the RFID device 16 is installed into casing 10, top piece 12 fits into bottom piece 14 and the edges of bottom piece 14 are rolled over to close the package. In one embodiment RFID devices 16 is placed into plastic cup 18 before installing into casing 10. As will be shown in FIGS. 2 and 3, epoxy filler 20 is used with both embodiments.

Figure 2:
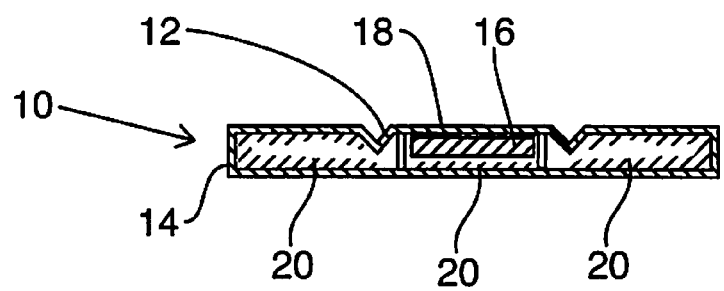
FIG. 2 is a cross section of the device of FIG. 1.

FIG. 2 is a cross sectional view of the token of FIG. 1. FIG. 2 shows the positioning of plastic cup 18 and epoxy filler 20 in greater detail.

Figure 3:
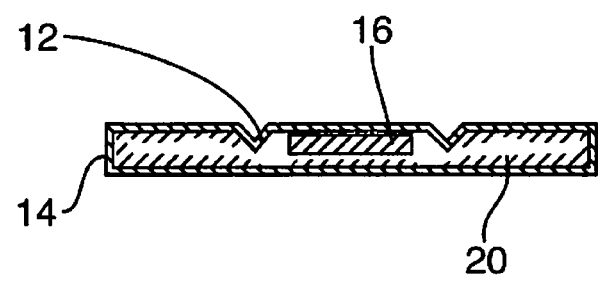
FIG. 3 is another cross section of the device of FIG. 1.

FIG. 3 shows the token of FIG. 1 without plastic cup 18. In this embodiment epoxy filler 20 surrounds RFID device 16.

In another embodiment, a punched metal casing is used in place of drawn casing 10. The punched metal casing is fabricated with a central cut-out to allow later insertion of the RFID device 16, epoxy filler 20, and optionally plastic cup 18. The central cut-out and outer shape of the token are created with standard metal punching practice with the exception that the relationship of punch outside dimension to die inside dimension is closely controlled to create an optimum shaped hole. This hole shape includes an increasing opening size from center outwards. This creates a necked area that the RFID device 16—by mechanical means of the epoxy filler 20 and optionally the plastic cup 18—eventually will be fit therein.

Figure 4:
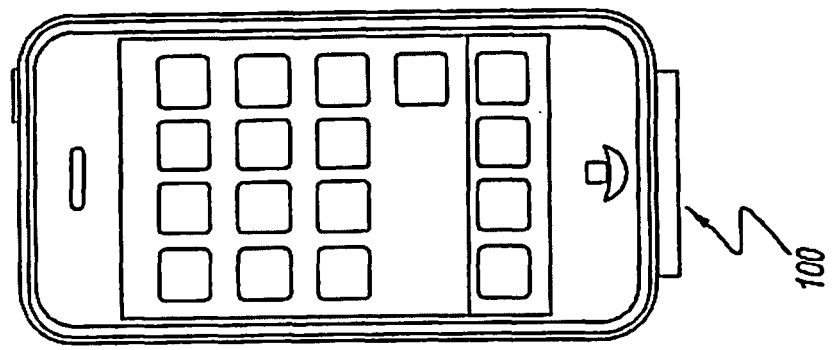
FIG. 4 is a front view of a typical recorder/player device.

FIG. 4 is a front view of a typical recorder/player device.

Figure 5:
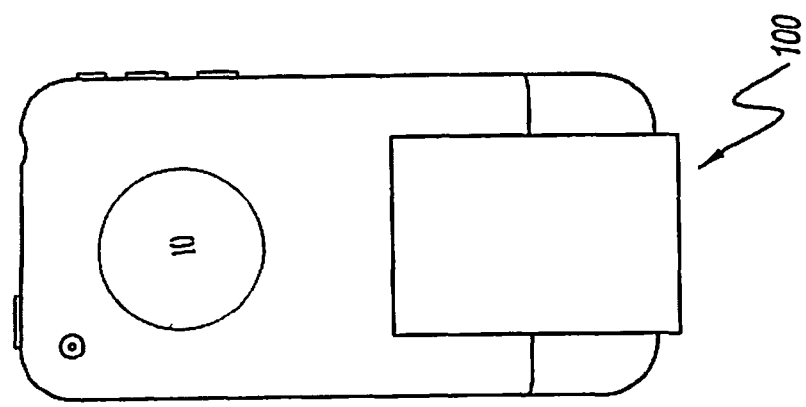
FIG. 5 is a back view of a typical recorder/player with the device of FIG. 1 attached.

FIG. 5 is a back view of a typical recorder/player with the device of FIG. 1 attached.

FIG. 5 shows memory chip device 10 attached to recorder/player 100. When additional memory is needed for player/recorder device 100, peripheral storage device 10 allows a user to record content, store it on storage device 10, retrieve the content, and display/play the content on device 100.

Figure 6:
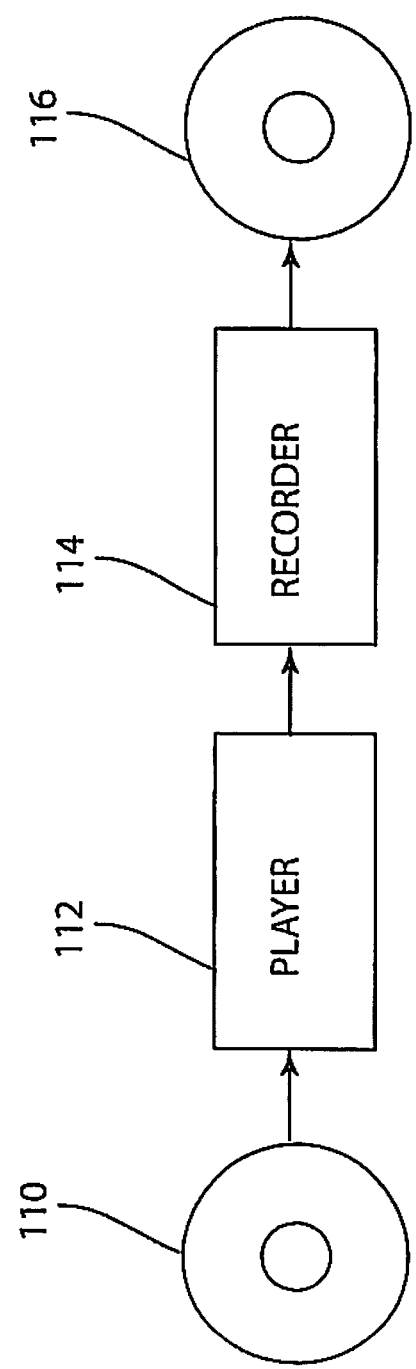
FIG. 6 is a diagram explaining a process for loading information into the device of FIG. 1.

FIG. 6 is a diagram explaining a process for loading information onto the device of FIG. 1.

Device 110 may have original-source audio signals digitally recorded therein. The digital audio signals are recorded in a predetermined recording format.

Player 112 plays device 110 to reproduce the digital audio signals read from device 110. The digital audio signals are sent along with the additional information to recorder 114.

Receiving the digital audio signals, recorder 114 will record the digital signals to another recordable device 116.

In addition to these embodiments, persons skilled in the art can see that numerous modifications and changes may be made to the above invention without departing from the intended spirit and scope thereof.

I claim:

1. A memory chip device comprising:
a body comprising a housing and interior cavity;
a surface contact interface (SCI) attached to an exterior surface of the housing;
a memory chip attached to an exterior surface of the SCI;
a means for communicating between the memory chip and the SCI wherein the means is a plurality of contacts that provide coplanarity of the contacts for surface mounting; and
a means for communicating between the SCI and a player recording device.

2. A memory chip device according to claim 1 where the SCI is hard wired to the player/recorder device.

3. A memory chip device according to claim 1 wherein an adhesive attaches the SCI to the housing.

4. A memory chip device according to claim 1 wherein the means for communicating between the SCI and the player recording device is a plurality of contacts extending through the exterior surface of the housing wherein the contacts provide coplanarity for surface mounting.

5. A memory chip device according to claim 1 wherein the means for communicating between the SCI and the player recording device is a device connected to the player recording device and connected to the SCI.

* * * * *